(12) United States Patent
Chang et al.

(10) Patent No.: US 9,846,498 B2
(45) Date of Patent: Dec. 19, 2017

(54) DISPLAY DEVICE

(71) Applicant: INNOLUX CORPORATION, Chu-Nan, Miao-Li County (TW)

(72) Inventors: Chia-Hsiung Chang, Chu-Nan (TW); Yang-Chen Chen, Chu-Nan (TW); Hsia-Ching Chu, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 357 days.

(21) Appl. No.: 14/578,115

(22) Filed: Dec. 19, 2014

(65) Prior Publication Data
US 2016/0048251 A1 Feb. 18, 2016

(30) Foreign Application Priority Data

Aug. 12, 2014 (TW) .............................. 103127624 A

(51) Int. Cl.
*G06F 3/041* (2006.01)
*H01B 1/08* (2006.01)
*G06F 3/044* (2006.01)

(52) U.S. Cl.
CPC ............ *G06F 3/0412* (2013.01); *G06F 3/044* (2013.01); *H01B 1/08* (2013.01); *G06F 2203/04111* (2013.01)

(58) Field of Classification Search
CPC .................... G06F 3/0412; G06F 3/044; G06F 2203/04111; H01B 1/08
See application file for complete search history.

(56) References Cited

U.S. PATENT DOCUMENTS

| 8,029,886 B2 * | 10/2011 | Nashiki | G06F 3/045 428/220 |
| 8,227,077 B2 * | 7/2012 | Nashiki | G06F 3/045 428/220 |
| 2013/0087372 A1 * | 4/2013 | Nashiki | G06F 3/041 174/257 |

FOREIGN PATENT DOCUMENTS

| CN | 103761003 | 4/2014 |
| CN | 103928082 | 7/2014 |
| JP | 2011003446 | 1/2011 |
| JP | 5556436 | 7/2014 |
| TW | I374090 | 10/2012 |
| TW | I397927 | 6/2013 |
| TW | 201429702 | 8/2014 |

* cited by examiner

*Primary Examiner* — Latanya N Crawford
(74) *Attorney, Agent, or Firm* — Liu & Liu

(57) ABSTRACT

A display device having a first substrate with a first surface and a second surface opposite to the first surface; and a first patterned transparent conductive layer disposed on the first surface of the first substrate and having a first thickness, wherein the first patterned transparent conductive layer has at least a first zone and a second zone, the first zone locates between the second zone and the first substrate, and the first zone is a part of the first patterned transparent conductive layer neighboring to the first substrate and having a two-third (⅔) thickness of the first patterned transparent conductive layer, wherein a material of the first patterned transparent conductive layer incldues In, and an atomic amount of In in the second zone is larger than that in the first zone.

17 Claims, 2 Drawing Sheets

DISPLAY DEVICE

CROSS REFERENCE TO RELATED APPLICATION

This application claims the benefits of the Taiwan Patent Application Serial Number 103127624, filed on Aug. 12, 2014, the subject matter of which is incorporated herein by reference.

BACKGROUND OF THE INVENTION

1. Field of the Invention

The present invention relates to a display device and, more particularly to a display device with a transparent conductive layer having atomic contents present in a gradient.

2. Description of Related Art

Recently, with the development trend of user-friendly operation and simplicity, touch display devices with a display panel are becoming more and more widely used in life. Since the user can input signals directly by hands or other objects to access the touch display device, the user's dependence on other input devices (such as a keyboard, a mouse, a remote controller and so on) are thus reduced or even eliminated, thereby greatly facilitating the user's operation.

The touch panel technique may be divided into capacitive and resistive types according to signal generating mechanisms. A capacitive touch panel employs transparent conductive oxides (TCOs) as a material for sensing electrodes, which are arranged on a transparent substrate along the directions of vertical axis and horizontal axis, and capacitance is generated between the adjacent electrodes in the different axial directions. When a conductor (such as a finger or touch pen) approaches the sensing electrode, it changes the capacitance, thereby generating the tough signal. On the other hand, a resistive touch panel comprises two electrode layers, and dot spacers are disposed between the two electrode layers to insulate the two electrode layers. The two electrode layers are electrically connected when a pressure is applied by a touch of an object, thus generating a signal representing the potential difference, which is then transferred to a controller by a circuit to process and calculate the coordinate position of the touch spot.

When the TCOs are used as the material for the sensing electrodes, the metal contents therein are increased to enhance the conductivity of the obtained sensing electrodes. However, the increased metal contents may reduce the adhesion of the sensing electrodes to other unit therebelow, resulting poor film forming ability. In this case, the formed transparent conductive layer may be easily stripped, resulting in the conductivity thereof decreased.

Therefore, it is desirable to provide a transparent conductive film having atomic contents (especially, the metal atomic content) having gradient distribution to achieve the purpose of high adhesion and conductivity.

SUMMARY OF THE INVENTION

An object of the present invention is to provide a display device, wherein the indium (In) atomic amount in a transparent conductive layer thereof is present in a gradient to improve the conductivity thereof and the adhesion thereof to other units.

To achieve the object, the display device of the present invention comprises: a first substrate comprising a first surface and a second surface opposite to the first surface; and a first patterned transparent conductive layer disposed on the first surface of the first substrate and having a first thickness, wherein the first patterned transparent conductive layer at least comprises a first zone and a second zone, the first zone locates between the second zone and the first substrate, and the first zone is a part of the first patterned transparent conductive layer neighboring to the first substrate and having a two-thirds of the first thickness of the first patterned transparent conductive layer, wherein a material of the first patterned transparent conductive layer comprises In, and an atomic amount of In in the second zone is larger than that in the first zone based on a total atomic amount of the material of the first patterned transparent conductive layer.

In the display device of the present invention, the first zone locates between the second zone and the first substrate. Hence, from the first substrate, the first zone is a part of the first patterned transparent conductive layer neighboring to the first substrate as a bottom zone, the second zone is a part thereof far from the first substrate as a top zone, and the In atomic amount in the top zone is larger than that in the bottom zone.

In addition, the first zone of the first patterned transparent conductive layer may comprise a first sub-zone and a second sub-zone, the second sub-zone locates between the second zone and the first sub-zone, and an atomic amount of In in the second sub-zone is larger than that in the first sub-zone.

In the display device of the present invention, the first patterned transparent conductive layer is preferably a touch electrode layer, wherein the atomic amount of In in the second zone (top zone) is 5~40% and the atomic amount of In in the first zone (bottom zone) is 1~15% based on a total atomic amount of the material of the first patterned transparent conductive layer.

Furthermore, in the display device of the present invention, the material of the first patterned transparent conductive layer may further comprise Zn, and an atomic amount of Zn in the second zone is larger than that in the first zone based on a total atomic amount of the material of the first patterned transparent conductive layer. Alternatively, the material of the first patterned transparent conductive layer may further comprise Sn, and an atomic amount of Sn in the second zone is larger than that in the first zone based on a total atomic amount of the material of the first patterned transparent conductive layer.

The display device of the present invention may selectively further comprise: a second patterned transparent conductive layer disposed on the second surface of the first substrate. That is, two opposite surfaces of the first substrate are respectively disposed with the first patterned transparent conductive layer and the second patterned transparent conductive layer. In this case, the display device of the present invention may further comprise: a color filter layer disposed between the first substrate and the second patterned transparent conductive layer.

The display device of the present invention may selectively further comprise: a second substrate and a second patterned transparent conductive layer, wherein the second substrate faces to the second surface of the first substrate, and the second patterned transparent conductive layer is disposed on the second substrate and faces to the second surface of the first substrate. That is, the same sides of the first substrate and the second substrate simultaneously disposed with transparent conductive layers. In this case, the display device of the present invention may further comprise: a thin film transistor layer disposed between the second substrate and the second patterned transparent conductive layer.

In the aforementioned display device of the present invention, the second patterned transparent conductive layer has a second thickness and at least comprises a third zone and a fourth zone, the third zone locates between the fourth zone and the first substrate/the second substrate, and the third zone is a part of the second patterned transparent conductive layer neighboring to the first substrate/the second substrate and having a two-thirds of the second thickness of the second patterned transparent conductive layer, wherein a material of the second patterned transparent conductive layer comprises In, and an atomic amount of In in the fourth zone is larger than that in the third zone based on a total atomic amount of the material of the second patterned transparent conductive layer.

In addition, in the display device of the present invention, preferably, the atomic amount of In in the third zone is larger than that in the first zone, and the atomic amount of In in the fourth zone is larger than that in the second zone.

Furthermore, in the display device of the present invention, the material of the second patterned transparent conductive layer may further comprise Zn, and an atomic amount of Zn in the fourth zone is larger than that in the third zone based on a total atomic amount of the material of the second patterned transparent conductive layer. Alternatively, the material of the second patterned transparent conductive layer may further comprise Sn, and an atomic amount of Sn in the fourth zone is larger than that in the third zone based on a total atomic amount of the material of the second patterned transparent conductive layer.

In the aforementioned aspects of the present invention, in either the first patterned transparent conductive layer or the second patterned transparent conductive later, the atomic amount of In (and Zn or Sn) in one part thereof close to the substrate (bottom zone) is lower than that in another part thereof far from the substrate (top zone). Thus, the adhesion of the bottom zone of the transparent conductive layer to the substrate or units formed thereon can be improved, and the conductivity of the top zone thereof can also be increased.

In addition, the display device of the present invention can be used as a liquid crystal display (LCD) device or an organic light emitting diode (OLED) display device.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Figure 1:
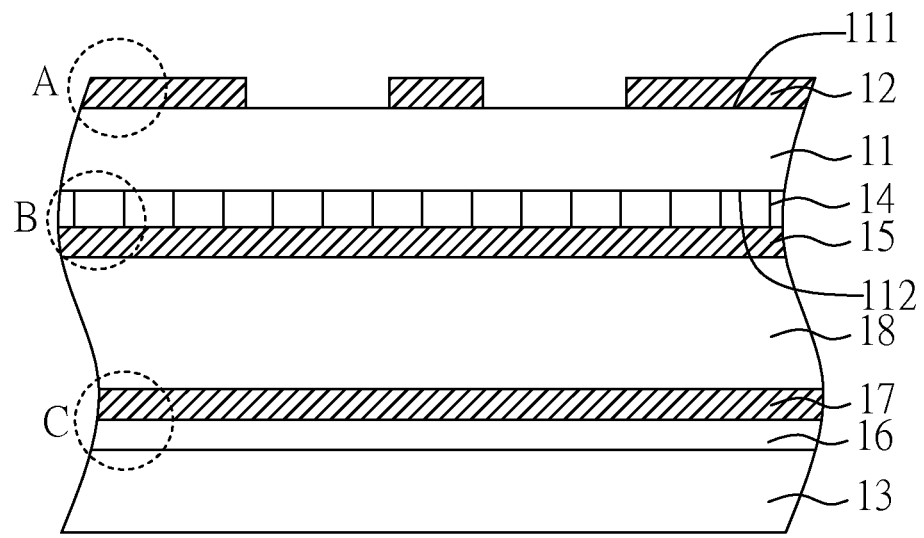
FIG. 1 is a perspective view of a display device according to one preferred embodiment of the present invention.

FIG. 1 is a perspective view of a display device in the present embodiment. The display device of the present embodiment comprises: a first substrate 11 comprising a first surface 111 and a second surface 112 opposite to the first surface 111; and a first patterned transparent conductive layer 12 disposed on the first surface 111 of the first substrate 11. In the present embodiment, the first patterned transparent conductive layer 12 is a touch electrode layer, and the structure thereof is shown in FIGS. 2 and 3.

Figure 2:
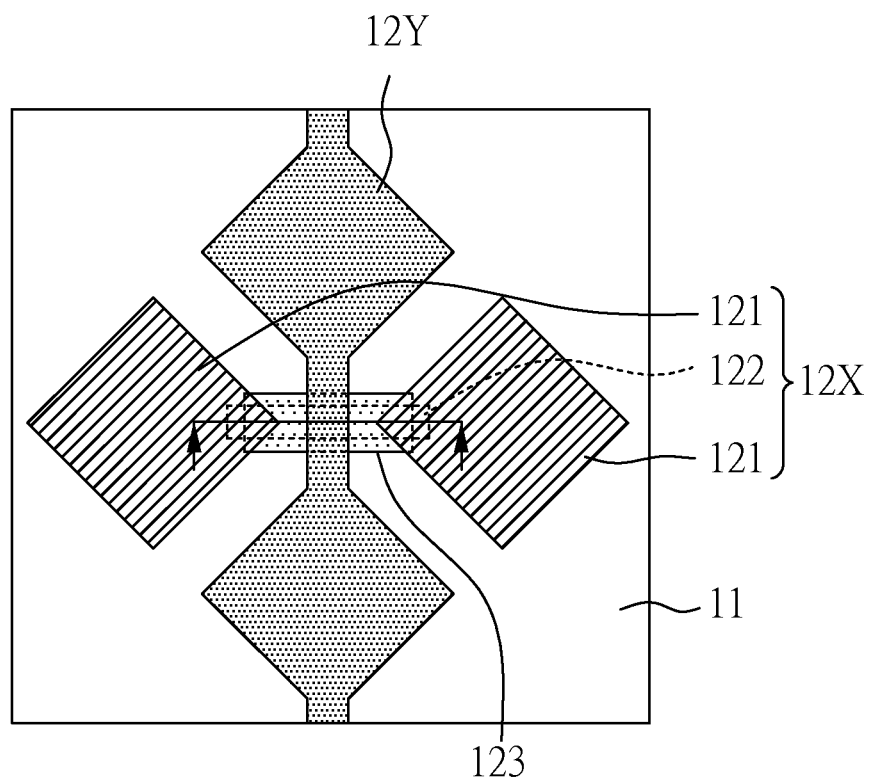
FIG. 2 is a perspective view of a touch electrode layer in a display device according to one preferred embodiment of the present invention.
Figure 3:
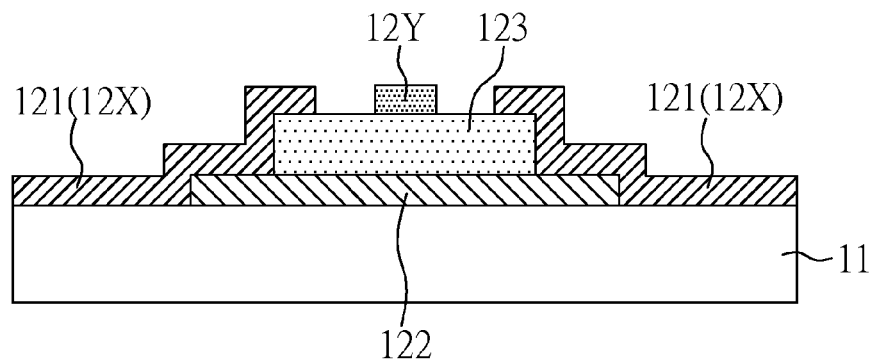
FIG. 3 is a cross-sectional view of a touch electrode layer in a display device according to one preferred embodiment of the present invention.

FIG. 2 is a perspective view of the touch electrode layer in the present embodiment, and FIG. 3 is a cross-sectional view of the touch electrode layer long an A-A' line indicated in FIG. 2. In the present embodiment, plural first direction electrodes 12X and plural second direction electrodes 12Y for touch sensing are disposed on the first substrate 11, and the first direction electrodes 12X and the second direction electrodes 12Y respectively extend to different directions. Herein, the first direction electrodes 12X may comprise two adjacent electrode pads 121 which electrically connect to each other with a bridge part 122. In the present embodiment, the bridge part 122 is formed on the first substrate 11 in advance, followed by forming an insulating layer 123 on the bridge part 122 to expose partial bridge part 122. Then, the electrode pads 121 of the first direction electrodes 12X and the second direction electrodes 12Y are simultaneously formed, and the electrode pads 121 connect to each other with the bridge part 122 exposed from the insulating layer 123. Herein, only one type of the touch electrode layer is exemplified in the present embodiment. In other embodiments of the present invention, the structure of the touch electrode layer is not limited thereto.

In addition, as shown in FIG. 1, the display device of the present embodiment further comprises a second substrate 13 facing to the second surface 112 of the first substrate 11.

In the present invention, any units known in the art can be respectively formed on the first substrate 11 and the second substrate 13. For example, when the display device of the present embodiment is a LCD device, one of the first substrate 11 and the second substrate 13 may be disposed with thin film transistor (TFT) units, and the other one may be disposed with a color filter (CF) layer and a black matrix (BM) layer. Alternatively, one of the first substrate 11 and the second substrate 13 is a color filter on array (COA) substrate with both TFT units and CF layer formed thereon, and the other one is a substrate with the BM formed thereon. Herein, the space between the first substrate 11 and the second substrate 13 is further filled with liquid crystal molecules. When the display device of the present embodiment is an OLED display device, one of the first substrate 11 and the second substrate 13 is disposed with an organic light emitting layer, and the other one is disposed with a BM layer and selectively disposed with a CF layer. The structures of the aforementioned LCD display device are known in the art, and thus the detail descriptions thereof are not illustrated herein.

Herein, the LCD device is illustrated in the present embodiment. As shown in FIG. 1, the second surface 112 of the first substrate 11 is disposed with a CF layer 14 and a second patterned transparent conductive layer as a common electrode layer 15, and the CF layer 14 is disposed between the second surface 112 of the first substrate 11 and the common electrode layer 15. In addition, the second substrate 13 is disposed with a TFT layer 16 and another second patterned transparent conductive layer as a pixel electrode layer 17, wherein the pixel electrode layer 17 faces to the second surface 112 of the first substrate 11 and the TFT layer 16 is disposed between the second substrate 13 and the pixel electrode layer 17. Furthermore, a liquid crystal layer 18 is sandwiched between the first substrate 11 and the second substrate 13.

In the present embodiment, the first patterned transparent conductive layer 12 and the second patterned transparent conductive layer (including the common electrode layer 15 and the pixel electrode layer 17) are made of transparent electrode materials generally used in the art, such as transparent conductive oxides. Examples of the transparent conductive oxides may comprise: $In_2O_3$, $In_2O_3$:Sn (ITO), ZnO: In (IZO), $In_2O_3$—ZnO, and $CdIn_2O_4$; but the present invention is not limited thereto, as long as the used transparent conductive oxides for the patterned transparent conductive layer comprises indium (In).

Figures 4, 5:
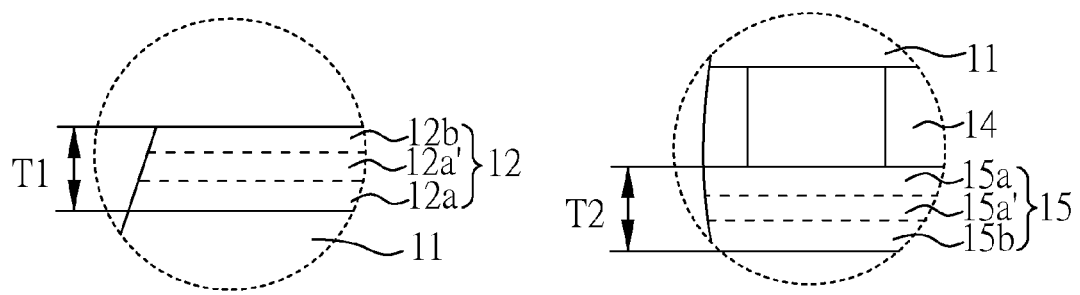
FIG. 4 is an enlarged view showing a part of a touch electrode layer in a display device according to one preferred embodiment of the present invention.
FIG. 5 is an enlarged view showing a part of a common electrode layer in a display device according to one preferred embodiment of the present invention.

FIG. 4 is an enlarged view of the region A indicated in FIG. 1. The first patterned transparent conductive layer 12 of the present embodiment has a first thickness T1 and at least comprises a first zone comprising a first sub-zone 12a and a second sub-zone 12a' and a second zone 12b. The first zone comprising the first sub-zone 12a and the second sub-zone 12a' locates between the second zone 12b and the first substrate 11, and the first zone comprising the first sub-zone 12a and the second sub-zone 12a' is a part of the first patterned transparent conductive layer 12 neighboring to the first substrate 11 and having a two-thirds (⅔) of the first thickness T1 of the first patterned transparent conductive layer 12. In addition, the second sub-zone 12a' locates between the second zone 12b and the first sub-zone 12a, the first sub-zone 12a is a part of the first patterned transparent conductive layer 12 neighboring to the first substrate 11 and having a one-thirds (⅓) of the first thickness T1 of the first patterned transparent conductive layer 12, and the second sub-zone 12a' is a part of the first patterned transparent conductive layer 12 from a height having a one-thirds (⅓) of the first thickness T1 to a height having two-thirds (⅔) of the first thickness T1.

Herein, the first zone comprising a first sub-zone 12a and a second sub-zone 12a' is a region close to the first substrate 11 and can be considered as a bottom zone, and the second zone 12b is a region far from the first substrate 11 and can be considered as a top zone. Based on a total atomic amount of the material of the first patterned transparent conductive layer 12, an atomic amount of In in the second zone 12b (top zone) is larger than that in the first zone comprising a first sub-zone 12a and a second sub-zone 12a' (bottom zone). In addition, an atomic amount of In in the second sub-zone 12a' is larger than that in first sub-zone 12a. Hence, from the first substrate 11, the In atomic amount in the first patterned transparent conductive layer 12 is gradually increased. Preferably, the atomic amount of In in the second zone 12b (top zone) is 5~40% and the atomic amount of In in the first zone comprising a first sub-zone 12a and a second sub-zone 12a' (bottom zone) is 1~15% based on a total atomic amount of the material of the first patterned transparent conductive layer 12.

Meanwhile, when high valence atoms such as Zn or Sn are doped into the material of the first patterned transparent conductive layer 12 to increase the carrier concentration therein, an atomic amount of Zn or Sn in the second zone 12b (top zone) is larger than that in the first zone comprising a first sub-zone 12a and a second sub-zone 12a' (bottom zone) based on a total atomic amount of the material of the first patterned transparent conductive layer 12. Hence, from the first substrate 11, the Zn or Sn atomic amount in the first patterned transparent conductive layer 12 is gradually increased.

FIG. 5 is an enlarged view of the region B indicated in FIG. 1. Herein, the second patterned transparent conductive layer as the common electrode layer 15 has a second thickness T2 and at least comprises a third zone 15a, 15a' and a fourth zone 15b, the third zone 15a, 15a' locates between the fourth zone 15b and the first substrate 11, and the third zone 15a, 15a' is a part of the common electrode layer 15 neighboring to the first substrate 11 and having a two-thirds of the second thickness T2 of the common electrode layer 15.

Figure 6:
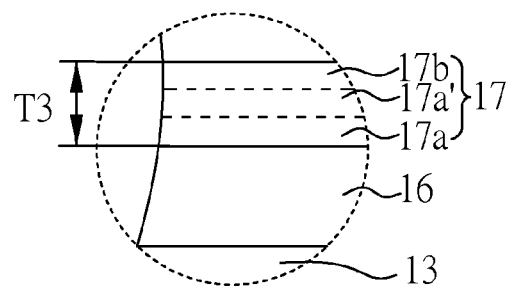
FIG. 6 is an enlarged view showing a part of a pixel electrode layer in a display device according to one preferred embodiment of the present invention.

FIG. 6 is an enlarged view of the region C indicated in FIG. 1. Herein, the second patterned transparent conductive layer as the pixel electrode layer 17 has another second thickness T3 and at least comprises a third zone 17a, 17a' and a fourth zone 17b, the third zone 17a, 17a' locates between the fourth zone 17b and the second substrate 13, and the third zone 17a, 17a' is a part of the pixel electrode layer 17 neighboring to the second substrate 13 and having a two-thirds of the second thickness T3 of the pixel electrode layer 17.

In FIGS. 5 and 6, the third zone 15a, 15a' and the third zone 17a, 17a' are respectively a region close to the first substrate 11 and the second substrate 13 and can be considered as a bottom zone, and the fourth zone 15b and the fourth zone 17b are respectively a region far from the first substrate 11 and the second substrate 13 and can be considered as a top zone. Based on a total atomic amount of the material of the common electrode layer 15 and the pixel electrode layer 17, an atomic amount of In in the fourth zone 15b and the fourth zone 17b (top zone) is larger than that in the third zone 15a, 15a' and the third zone 17a, 17a' (bottom zone).

Meanwhile, when high valence atoms such as Zn or Sn are doped into the material of the second patterned transparent conductive layer for the common electrode layer 15 or the pixel electrode layer 17 to increase the carrier concentration therein, an atomic amount of Zn or Sn in the fourth zone 15b or the fourth zone 17b (top zone) is larger than that in the third zone 15a, 15a' and the third zone 17a, 17a' (bottom zone) based on a total atomic amount of the material of the common electrode layer 15 or the pixel electrode layer 17. Hence, from the first substrate 11 or the second substrate 13, the Zn or Sn atomic amount in the common electrode layer 15 or the pixel electrode layer 17 is gradually increased.

In the present embodiment, the first patterned transparent conductive layer 12, the common electrode layer 15 and the pixel electrode layer 17 can be formed through a deposition process. Herein, during an initial period to a medium period of the deposition process, a stable oxygen partial pressure is introduced to reduce the ratio of In (or Zn or Sn), and thus the adhesion of the formed transparent conductive layer to the substrate or units can be increased. Due to the high coordinate bonds of the oxygen atoms in the bottom zone of the transparent conductive layer and the large electronegativity of the oxygen atoms, the electrons of the metal atoms are easily attracted by the oxygen atoms to form ionic bonds to increase the adhesion of the transparent conductive layer. Compared to the conventional transparent conductive layer, the unstable oxygen partial pressure during the initial period of the deposition process may cause poor adhesion of the formed transparent conductive layer, and thus the formed transparent conductive layer may be easily stripped, resulting in the conductivity thereof decreased.

During the later period of the deposition process and before the process finished, oxygen partial pressure is adjusted to be lower than that used during the initial period to the medium period, resulting in the ratio of In (or Zn or Sn) increased to enhance the conductivity of the formed transparent conductive layer. The low coordinate bonds of the oxygen atoms in the top zone of the transparent conductive layer can be achieved by introducing reduced amount of oxygen, and the vacancies of the oxygen atoms form free electrons, resulting in the electron conductivity on the surface of the top zone of the obtained transparent conductive layer increased to enhance the overall conductivity of the top zone.

In addition, in the first patterned transparent conductive layer 12, the common electrode layer 15 and the pixel electrode layer 17, preferably, the atomic amount of In in the third zones 15a, 15a', 17a, 17a' is larger than that in the first zone comprising a first sub-zone 12a and a second sub-zone 12a', and the atomic amount of In in the fourth zones 15b, 17b is larger than that in the second zone 12b, in order to the requirement for different conductivities.

Embodiment 1

In the present embodiment, as shown in FIGS. 1, 4 and 5, the first patterned transparent conductive layer 12 of the touch panel is an IZO thin film, and the second patterned transparent conductive layer as the common electrode layer 15 is an ITO thin film.

Herein, an Energy Dispersive Spectroscopy (EDS) is used to measure the atomic contents in the first patterned transparent conductive layer 12 and the common electrode layer 15. By using the EDS coupled with a field emission scanning electron microscope (FESEM) for observing shapes of samples to be detected, a specific X-ray generated from the sample when electrons hit can be detected to obtain the atomic contents in a tiny region. The obtained atomic contents in the IZO thin film as the first patterned transparent conductive layer 12 and the ITO thin film as the common electrode layer 15 are shown in the following Tables 1 and 2.

TABLE 1

|  | Mg (%) | Al (%) | Si (%) | K (%) | Ca (%) | Zn (%) | Pd (%) | In (%) | Sn (%) | W (%) |
| --- | --- | --- | --- | --- | --- | --- | --- | --- | --- | --- |
| Second zone 12b | 0.58 | 2.30 | 6.58 | 1.16 | 0.51 | 6.39 | 1.05 | 24.37 | −1.01 | 4.25 |
| Second sub-zone 12a' | 1.12 | 3.57 | 10.29 | 0.84 | 1.09 | 4.84 | 0.67 | 19.61 | −0.34 | 4.85 |
| First sub-zone 12a | 1.15 | 4.62 | 13.95 | 0.44 | 1.29 | 2.98 | 0.74 | 13.26 | −0.35 | 7.09 |

TABLE 2

|  | Al (%) | Si (%) | Zn (%) | Pd (%) | In (%) | Sn (%) |
| --- | --- | --- | --- | --- | --- | --- |
| Fourth zone 15b | 1.08 | 2.33 | −0.41 | 4.04 | 36.07 | 4.91 |
| Third zone 15a' | 1.25 | 2.97 | −0.08 | 4.65 | 32.86 | 3.54 |
| Third zone 15a | 1.56 | 3.30 | 0.09 | 2.85 | 34.42 | 4.04 |

Note: The third zone 15a is a part of the common electrode 15 neighboring to the first substrate 11 and having a one-thirds (⅓) of the second thickness T2 of the common electrode 15, and the third zone 15a' is a part of the common electrode 15 from a height having a one-thirds (⅓) of the second thickness T2 to a height having two-thirds (⅔) of the second thickness T2.

As shown in FIG. 4 and Table 1, in the present embodiment, based on a total atomic amount of the material of the transparent conductive layer, the In atomic amount is 13.26% as well as the Zn atomic amount is 2.98% in the first sub-zone 12a; the In atomic amount is 19.61% as well as the Zn atomic amount is 4.84% in the second sub-zone 12a'; and the In atomic amount is 24.37% as well as the Zn atomic amount is 6.39% in the second zone 12b.

As shown in FIG. 5 and Table 2, in the present embodiment, based on a total atomic amount of the material of the transparent conductive layer, the In atomic amount is 34.42% as well as the Sn atomic amount is 4.04% in the third zone 15a; the In atomic amount is 32.86% as well as the Sn atomic amount is 3.54% in the third zone 15a'; and the In atomic amount is 36.07% as well as the Sn atomic amount is 4.91% in the fourth zone 15b.

Embodiment 2

In the present embodiment, as shown in FIGS. 1, 4 and 6, both the first patterned transparent conductive layer 12 of the touch panel and the second patterned transparent conductive layer as the pixel electrode layer 17 are ITO thin films. Herein, the same method illustrated in Embodiment 1 is used to measure the atomic contents in the first patterned transparent conductive layer 12 and the pixel electrode layer 17. The obtained atomic contents in the ITO thin film as the first patterned transparent conductive layer 12 and the ITO thin film as the pixel electrode layer 17 are shown in the following Tables 3 and 4.

TABLE 3

| | C (%) | Mg (%) | Al (%) | Si (%) | Ca (%) | Zn (%) | Pd (%) | In (%) | Sn (%) | W (%) |
|---|---|---|---|---|---|---|---|---|---|---|
| Second zone 12b | — | 1.07 | 4.91 | 9.88 | 0.85 | 0.44 | 3.12 | 12.04 | 1.90 | 2.79 |
| Second sub-zone 12a' | — | 1.11 | 4.50 | 10.43 | 0.59 | −0.05 | 3.05 | 11.60 | 0.98 | 2.83 |
| First sub-zone 12a | 9.47 | 1.08 | 5.61 | 8.95 | — | 0.49 | 4.17 | 7.37 | 0.75 | — |

Note:
"—" indicates non-detected.

TABLE 4

| | N (%) | Si (%) | S (%) | Zn (%) | Zr (%) | Pd (%) | In (%) | Sn (%) |
|---|---|---|---|---|---|---|---|---|
| Fourth zone 17b | 25.88 | 7.52 | — | 0.29 | — | 2.46 | 23.69 | 2.24 |
| Third zone 17a' | 22.48 | 10.21 | — | 0.19 | 0.13 | 0.87 | 20.88 | 1.89 |
| Third zone 17a | 36.86 | 14.54 | 0.22 | 0.03 | — | 1.08 | 16.86 | 1.21 |

Note:
"—" indicates non-detected.

Note: The third zone 17a is a part of the pixel electrode layer 17 neighboring to the second substrate 13 and having a one-thirds (⅓) of the second thickness T3 of the pixel electrode layer 17, and the third zone 17a' is a part of the pixel electrode layer 17 from a height having a one-thirds (⅓) of the second thickness T3 to a height having two-thirds (⅔) of the second thickness T3.

As shown in FIG. 4 and Table 3, in the present embodiment, based on a total atomic amount of the material of the transparent conductive layer, the In atomic amount is 7.37% as well as the Sn atomic amount is 0.75% in the first sub-zone 12a; the In atomic amount is 11.60% as well as the Sn atomic amount is 0.98% in the second sub-zone 12a'; and the In atomic amount is 12.04% as well as the Sn atomic amount is 1.90% in the second zone 12b.

As shown in FIG. 6 and Table 4, in the present embodiment, based on a total atomic amount of the material of the transparent conductive layer, the In atomic amount is 16.86% as well as the Sn atomic amount is 1.21% in the third zone 17a; the In atomic amount is 20.88% as well as the Sn atomic amount is 1.89% in the third zone 17a'; and the In atomic amount is 23.69% as well as the Sn atomic amount is 2.24% in the fourth zone 17b.

Embodiment 3

In the present embodiment, as shown in FIGS. 1 and 4, the first patterned transparent conductive layer 12 of the touch panel is an ITO thin film. Herein, the same method illustrated in Embodiment 1 is used to measure the atomic contents in the first patterned transparent conductive layer 12. The obtained atomic contents in the ITO thin film as the first patterned transparent conductive layer 12 is shown in the following Table 5.

TABLE 5

| | Na (%) | Mg (%) | Al (%) | Si (%) | K (%) | Zn (%) | Zr (%) | Pd (%) | In (%) | Sn (%) |
|---|---|---|---|---|---|---|---|---|---|---|
| Second zone 12b | 2.18 | 1.29 | 2.93 | 15.12 | 3.85 | −0.06 | −0.25 | 0.70 | 8.17 | 1.43 |
| Second sub-zone 12a' | 2.71 | 1.49 | 3.61 | 17.93 | 4.16 | −0.14 | −0.14 | — | 4.22 | 0.85 |
| First sub-zone 12a | 2.70 | 1.47 | 3.61 | 18.34 | 4.15 | −0.40 | 0.05 | — | 4.22 | 0.69 |

Note:
"—" indicates non-detected.

As shown in FIG. 4 and Table 5, in the present embodiment, based on a total atomic amount of the material of the transparent conductive layer, the In atomic amount is 4.22% as well as the Sn atomic amount is 0.69% in the first sub-zone 12a; the In atomic amount is 4.22% as well as the Sn atomic amount is 0.85% in the second sub-zone 12a'; and the In atomic amount is 8.17% as well as the Sn atomic amount is 1.43% in the second zone 12b.

Embodiment 4

In the present embodiment, as shown in FIGS. 1 and 4, the first patterned transparent conductive layer 12 of the touch panel is an $In_2O_3$—ZnO thin film. Herein, the same method illustrated in Embodiment 1 is used to measure the atomic contents in the first patterned transparent conductive layer 12. The obtained atomic contents in the $In_2O_3$—ZnO thin film as the first patterned transparent conductive layer 12 is shown in the following Table 6.

TABLE 6

| | C (%) | N (%) | Mg (%) | Al (%) | Si (%) | S (%) | K (%) | Ca (%) | Zn (%) | In (%) | Sn (%) |
|---|---|---|---|---|---|---|---|---|---|---|---|
| Second zone 12b | — | — | — | 8.17 | 6.5 | — | — | — | 2.32 | 18.81 | 4.14 |
| Second sub-zone 12a' | 16.81 | — | — | 8.12 | 4.73 | 0.73 | — | 0.81 | 0.2 | 14.39 | 0.79 |
| First sub-zone 12a | — | 5.04 | 0.24 | 6.6 | 5.42 | 0.53 | 0.73 | 0.68 | 0.01 | 18.74 | 2.1 |

Note:
"—" indicates non-detected.

As shown in FIG. 4 and Table 6, in the present embodiment, based on a total atomic amount of the material of the transparent conductive layer, the In atomic amount is 18.74%, the Zn atomic amount is 0.01% as well as the Sn atomic amount is 2.1% in the first sub-zone 12a; the In atomic amount is 14.39%, the Zn atomic amount is 0.2% as well as the Sn atomic amount is 0.79% in the second sub-zone 12a'; and the In atomic amount is 18.81%, the Zn atomic amount is 2.32% as well as the Sn atomic amount is 4.14% in the second zone 12b.

Furthermore, the display device provided by the aforementioned embodiments of the present invention can be applied to any electronic device equipped with a LCD device or an OLED display device, such as mobile phones, notebooks, cameras, video cameras, music players, navigation systems, and televisions.

Although the present invention has been explained in relation to its preferred embodiment, it is to be understood that many other possible modifications and variations can be made without departing from the spirit and scope of the invention as hereinafter claimed.

What is claimed is:

1. A display device, comprising:
a first substrate comprising a first surface and a second surface opposite to the first surface; and
a first patterned transparent conductive layer disposed on the first surface of the first substrate and having a first thickness, wherein the first patterned transparent conductive layer at least comprises a first zone and a second zone, the first zone locates between the second zone and the first substrate, and the first zone is a part of the first patterned transparent conductive layer neighboring to the first substrate and having a two-thirds of the first thickness of the first patterned transparent conductive layer,
wherein a material of the first patterned transparent conductive layer comprises In, and an atomic amount of In in the second zone is larger than that in the first zone based on a total atomic amount of the material of the first patterned transparent conductive layer.

2. The display device as claimed in claim 1, wherein the material of the first patterned transparent conductive layer further comprises Zn, and an atomic amount of Zn in the second zone is larger than that in the first zone based on a total atomic amount of the material of the first patterned transparent conductive layer.

3. The display device as claimed in claim 1, wherein the material of the first patterned transparent conductive layer further comprises Sn, and an atomic amount of Sn in the second zone is larger than that in the first zone based on a total atomic amount of the material of the first patterned transparent conductive layer.

4. The display device as claimed in claim 1, wherein the first zone of the first patterned transparent conductive layer comprises a first sub-zone and a second sub-zone, the second sub-zone locates between the second zone and the first sub-zone, and an atomic amount of In in the second sub-zone is larger than that in the first sub-zone.

5. The display device as claimed in claim 1, wherein the first patterned transparent conductive layer is a touch electrode layer, the atomic amount of In in the second zone is 5~40% and the atomic amount of In in the first zone is 1~15% based on a total atomic amount of the material of the first patterned transparent conductive layer.

6. The display device as claimed in claim 1, further comprising: a second patterned transparent conductive layer disposed on the second surface of the first substrate, wherein the second patterned transparent conductive layer has a second thickness and at least comprises a third zone and a fourth zone, the third zone locates between the fourth zone and the first substrate, and the third zone is a part of the second patterned transparent conductive layer neighboring to the first substrate and having a two-thirds of the second thickness of the second patterned transparent conductive layer, wherein a material of the second patterned transparent conductive layer comprises In, and an atomic amount of In in the fourth zone is larger than that in the third zone based on a total atomic amount of the material of the second patterned transparent conductive layer.

7. The display device as claimed in claim 6, further comprising: a color filter layer disposed between the first substrate and the second patterned transparent conductive layer.

8. The display device as claimed in claim 6, wherein the atomic amount of In in the third zone is larger than that in the first zone, and the atomic amount of In in the fourth zone is larger than that in the second zone.

9. The display device as claimed in claim 6, wherein the material of the second patterned transparent conductive layer further comprises Zn, and an atomic amount of Zn in the fourth zone is larger than that in the third zone based on a total atomic amount of the material of the second patterned transparent conductive layer.

10. The display device as claimed in claim 6, wherein the material of the second patterned transparent conductive layer further comprises Sn, and an atomic amount of Sn in the fourth zone is larger than that in the third zone based on a total atomic amount of the material of the second patterned transparent conductive layer.

11. The display device as claimed in claim 1, further comprising: a second substrate and a second patterned transparent conductive layer, wherein the second substrate faces to the second surface of the first substrate, and the second patterned transparent conductive layer is disposed on the second substrate and faces to the second surface of the first substrate, wherein the second patterned transparent conductive layer has a second thickness and at least comprises a third zone and a fourth zone, the third zone locates between the fourth zone and the second substrate, and the third zone is a part of the second patterned transparent conductive layer neighboring to the second substrate and having a two-thirds of the second thickness of the second patterned transparent conductive layer, wherein a material of the second patterned transparent conductive layer comprises In, and an atomic amount of In in the fourth zone is larger than that in the third zone based on a total atomic amount of the material of the second patterned transparent conductive layer.

12. The display device as claimed in claim 11, further comprising: a thin film transistor layer disposed between the second substrate and the second patterned transparent conductive layer.

13. The display device as claimed in claim 12, wherein the atomic amount of In in the third zone is larger than that in the first zone, and the atomic amount of In in the fourth zone is larger than that in the second zone.

14. The display device as claimed in claim 11, wherein the material of the second patterned transparent conductive layer further comprises Zn, and an atomic amount of Zn in the fourth zone is larger than that in the third zone based on a total atomic amount of the material of the second patterned transparent conductive layer.

15. The display device as claimed in claim 11, wherein the material of the second patterned transparent conductive layer further comprises Sn, and an atomic amount of Sn in the fourth zone is larger than that in the third zone based on a total atomic amount of the material of the second patterned transparent conductive layer.

16. The display device as claimed in claim 6, further comprising: a second substrate and a third patterned transparent conductive layer, wherein the second substrate faces to the second surface of the first substrate, and the third patterned transparent conductive layer is disposed on the second substrate and faces to the second surface of the first substrate, wherein the third patterned transparent conductive layer has a third thickness and at least comprises a fifth zone and a sixth zone, the fifth zone locates between the sixth zone and the second substrate, and the fifth zone is a part of the third patterned transparent conductive layer neighboring to the second substrate and having a two-thirds of the third thickness of the third patterned transparent conductive layer, wherein a material of the third patterned transparent conductive layer comprises In, and an atomic amount of In in the sixth zone is larger than that in the fifth zone based on a total atomic amount of the material of the third patterned transparent conductive layer.

17. The display device as claimed in claim 16, further comprising: a thin film transistor layer disposed between the second substrate and the third patterned transparent conductive layer.

* * * * *